April 28, 1959    WOLF-WITO VON WITTERN ET AL    2,884,085
NOISE EXPOSURE METER
Filed Dec. 12, 1956

INVENTORS
WOLF-WITO VON WITTERN
HENNING E. VON GIERKE
BY
ATTORNEY
AGENT

United States Patent Office

2,884,085
Patented Apr. 28, 1959

2,884,085

NOISE EXPOSURE METER

Wolf-Wito von Wittern, Karlsruhe, Germany, and Henning E. von Gierke, Medway, Ohio, assignors to the United States of America as represented by the Secretary of the Air Force Application December 12, 1956, Serial No. 627,963

5 Claims. (Cl. 181—.5)

(Granted under Title 35, U.S. Code (1952), sec. 266)

The invention described herein may be manufactured and used by or for the United States Government for governmental purposes without payment to us of any royalty thereon.

This invention relates to a noise exposure meter for indicating the total time that noise exceeds certain predetermined levels.

Another object is to provide a device on which the total time that noise exceeds certain predetermined levels can be read directly.

Another object is to provide a device which makes it possible to follow accumulation of noise over long periods of time.

Another object is to provide a noise exposure meter of small size which can be worn by personnel under normal working conditions and which will not impede the normal working ability of said personnel.

These and other objects are accomplished by providing a transducer which will convert the noise to an electrical signal, amplify said signal, produce outputs when the signal exceeds certain predetermined intensity levels and indicate the total time that the signal is above said predetermined intensity levels.

The meter will give intensity versus time information in a given location and will allow monitoring of noise exposure of man, animals and equipment. The noise exposure meter will indicate the total time of exposure of personnel to different noise intensities connected with certain jobs and will help to achieve safer operation on these jobs.

Figure 1:
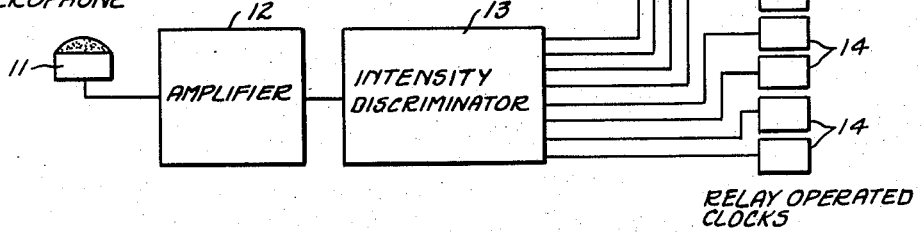
Fig. 1 is a block diagram of a noise exposure meter in accordance with the present invention.

Referring to Fig. 1 of the drawing the device consists generally of a microphone 11, an amplifier 12, an intensity discriminator 13 and a plurality of time counters 14.

The elements shown in block form in Fig. 1 may take various forms. The microphone may be any type which has satisfactory frequency response and sensitivity for the frequency range of interest. The amplifier may be a two or three stage amplifier. The intensity discriminator, in its simplest form may consist of $n$ electromagnetic relays connected to the output of the amplifier, where $n$ is equal to the number of intensity levels for which intesity versus time information is desired. The relays are adjusted so that the first relay is energized when the amplifier output current exceeds a value $i_1$ which is proportional to the noise level for which a first reading is desired. The second relay is energized when the amplifier output exceeds a value $i_2$ etc.

Figure 3:
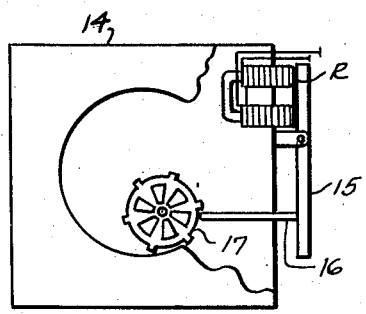
Fig. 3 is a fragmentary view of a timing device showing a relay control in accordance with the present invention.

The relays can control time counters 14 in a manner as shown in Fig. 3. Relay R operates a lever 15 which moves a rod 16 into and out of contact with the balance wheel 17 of any commercial type spring driven watch. The rod 16 is positioned so as to stop the balance wheel at one end position of its movement. When the relay is energized the rod is moved out of engagement with the balance wheel. It is obvious that other types of start-stop time counters could also be used.

Figure 2:
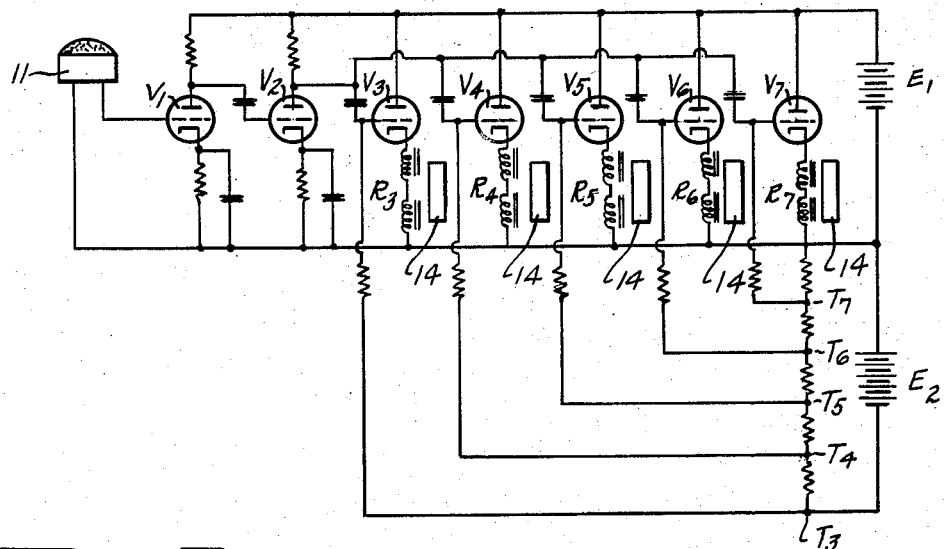
Fig. 2 is a schematic wiring diagram illustrating the arrangement and connection of the various elements of a preferred embodiment of an exposure meter in accordance with the present invention.

Fig. 2 shows one circuit for a noise meter which may be used. The microphone 11 converts the noise to an electrical signal which is amplified in tubes $V_1$ and $V_2$. The output of $V_2$ is applied to the grids of tubes $V_3$ through $V_7$. The grids of these tubes are connected to taps $T_3$ through $T_7$ respectively of a voltage divider across voltage source $E_2$. The tubes are therefore given different negative bias and will conduct at different levels of signal intensity. It can be seen from the drawing that $V_7$ will conduct first. When $V_7$ conducts relay $R_7$ is energized thereby starting its corresponding clock 14. If the signal also overcomes the bias on $V_6$, both relays $R_6$ and $R_7$ will be energized thereby starting clocks 14 corresponding to each of these relays. If the signal drops below the value at which $V_6$ conducts but stays above the value at which $V_7$ conducts, the clock operated by relay $R_6$ will stop and the clock operated by $R_7$ will continue to run.

Tubes $V_3$, $V_4$ and $V_5$ will conduct only when the signal is great enough to overcome the bias on their corresponding grids. It can also be seen from the drawings that tube $V_3$ will be the last to conduct and that all of the other tubes will be conducting when tube $V_3$ is conducting.

By using miniature tubes or transistors, small pocket size models of the exposure meter may be made.

There is thus provided a device which will indicate the total time that noise exceeds certain predetermined levels which can be made in small sizes and on which the information is given directly.

While certain embodiments of the invention have been described in some detail, it will be understood that numerous changes may be made without departing from the general principles and scope of the invention.

What is claimed is:

1. A noise exposure meter comprising: a transducer for converting noise to an electrical signal, a plurality of time counters, means associated with each time counter and responsive to said signal for actuating the corresponding time counter whenever the signal intensity exceeds a certain predetermined level, which is different for each of said means.

2. A noise exposure meter comprising: a transducer for converting noise to an electrical signal, a plurality of time counters, a plurality of means each being connected to a separate time counter for controlling its running time and means for making each of said first recited means operative at a different level of signal intensity.

3. A device to indicate the total time that noise exceeds certain predetermined levels comprising: a transducer for converting the noise to an electrical signal means for amplifying said signal, a plurality of time counters, a discriminator responsive to signal intensities corresponding to said predetermined levels and having an output circuit corresponding to each of said levels and a relay in each of said output circuits and connected to a time counter for controlling its running time.

4. A device for indicating the total time that a noise exceeds certain predetermined levels comprising: a microphone, an amplifier connected to said microphone, a plurality of means connected to said amplifier and each set to operate at a different signal level and a timing device connected to each of said means for indicating the total time that each means operates.

5. A noise exposure meter comprising: a microphone, an amplifier connected to said microphone, a plurality of tubes having their grids connected to the output of said amplifier, means for applying a different negative bias to the grid of each of said tubes so that each tube will conduct at a different signal intensity, a relay connected in the output circuit of each of said tubes, and a time clock connected to each relay, said relays acting to start and stop said clocks.

References Cited in the file of this patent

UNITED STATES PATENTS

| | | |
|---|---|---|
| 1,163,226 | Evans et al. | Dec. 7, 1915 |
| 2,486,890 | Stanmyre | Nov. 1, 1949 |
| 2,659,650 | MacDonald | Nov. 17, 1953 |